United States Patent
Rabinovitch et al.

(10) Patent No.: US 7,022,362 B2
(45) Date of Patent: Apr. 4, 2006

(54) METHOD OF FORMING CONFECTIONERY ARTICLES

(75) Inventors: Kevin Rabinovitch, Hackettstown, NJ (US); Shane Benedict, Hackettstown, NJ (US)

(73) Assignee: Mars Incorporated, McLean, VA (US)

( * ) Notice: Subject to any disclaimer, the term of this patent is extended or adjusted under 35 U.S.C. 154(b) by 341 days.

(21) Appl. No.: 10/342,516

(22) Filed: Jan. 15, 2003

(65) Prior Publication Data

US 2003/0148008 A1    Aug. 7, 2003

Related U.S. Application Data

(60) Provisional application No. 60/349,054, filed on Jan. 15, 2002.

(51) Int. Cl.
*A23F 5/00* (2006.01)
*A23G 1/00* (2006.01)

(52) U.S. Cl. ............ 426/306; 426/503; 426/512; 426/516; 426/517; 426/518; 99/450.2; 99/450.7

(58) Field of Classification Search ........ 99/450.2, 99/450.7; 426/503, 512, 516, 517, 518, 306
See application file for complete search history.

(56) References Cited

U.S. PATENT DOCUMENTS

| | | | |
|---|---|---|---|
| 3,303,796 A | 2/1967 | Novissimo | 107/54 |
| 3,603,270 A | 9/1971 | Tangel | 107/1 R |
| 4,120,627 A | 10/1978 | Abe | 425/92 |
| 4,882,185 A * | 11/1989 | Simelunas et al. | 426/283 |
| 5,078,204 A | 1/1992 | Loffredo et al. | 165/89 |
| 5,558,894 A | 9/1996 | Henson et al. | 426/498 |
| 5,902,621 A | 5/1999 | Beckett et al. | 426/279 |
| 6,251,454 B1 | 6/2001 | Layfield | 426/302 |
| 6,616,963 B1 * | 9/2003 | Zerby et al. | 426/660 |

FOREIGN PATENT DOCUMENTS

| | | |
|---|---|---|
| EP | 0 434 238 A2 | 6/1991 |
| EP | 0 776 608 A2 | 6/1997 |
| JP | 61 025435 A | 2/1986 |
| JP | 04 179445 | 6/1992 |
| WO | WO 95/24131 A1 | 9/1995 |
| WO | WO 98/56266 A1 | 12/1998 |

\* cited by examiner

*Primary Examiner*—Milton I. Cano
*Assistant Examiner*—Sarah L Kuhns
(74) *Attorney, Agent, or Firm*—Fitzpatrick, Cella, Harper & Scinto

(57) ABSTRACT

The present invention is directed to a process for making confectionery pieces, comprising the steps of (a) providing a solid or semi-solid edible slab having at least three layers to at least two forming elements having a nip defined by the forming elements; and (b) passing the edible slab through the nip, thereby forming a sheet of confectionery pieces or individual pieces, wherein the edible slab has a first outer layer, a second outer layer, and at least one inner layer between the first and second outer layers.

17 Claims, 1 Drawing Sheet

METHOD OF FORMING CONFECTIONERY ARTICLES

CROSS REFERENCE TO RELATED APPLICATIONS

This application claims the benefit of U.S. Provisional Application No. 60/349,054, filed on Jan. 15, 2002.

BACKGROUND OF THE INVENTION

1. Field of the Invention

The present invention relates to a process for making confectionery products. More particularly, the present invention relates to a process for making shaped confectionery articles wherein a solid or semi-solid multilayered edible slab is fed into a set of forming elements.

2. Description of the Related Art

Confectionery products can be shaped by using various methods and techniques. For example, liquid chocolate can be shaped by pouring it into a mould having the desired shape and then cooling it.

Similarly, forming rolls can be used to make confectionery articles. A set of forming rolls that have recesses or cavities on their surfaces are positioned with their axes of rotation parallel to one another, leaving a small gap between the rolls. Confectionery material, such as liquid chocolate is then poured into the space above and between the rolls. The surfaces of the rolls are cooled to a temperature that will solidify the chocolate as it comes in contact with the rolls. The liquid chocolate fills the cavities on the rolls and as the rolls rotate inwardly toward one another, the chocolate from the recesses of one roll are compressed and joined to the chocolate from the recesses of the other roll. The result is a web of substantially solidified pieces connected by a thin web of chocolate. A similar process is often used for forming peanut butter or sugar toffee based pieces. In the above described process, the rolls sit side by side. However, it should be understood that other roll configurations are possible, so long as one roll is positioned next to the other roll, forming a nip between the two.

An additional forming method is based on compaction of a plasticizable confectionery material, such as chocolate flakes. A parallel pair of rolls with engraved cavities are used to generate high pressure at the pinch point. That pressure serves to plasticize the confectionery material and results in discharge of solid pieces.

The prior art, however, does not teach a method of forming confectionery articles or pieces using forming elements, where the component to be shaped is a multilayered slab. Moreover, the layers, particularly the inner layers, in the multilayered slab may be sticky and/or contain inclusions. These type of components tend to be difficult to handle and often lead to product quality issues, such as misshapened pieces and product weight variation.

SUMMARY OF THE INVENTION

The present invention is directed to a process for making confectionery pieces. The process comprises the steps of (a) providing a solid or semi-solid edible slab having at least three layers to at least two forming elements having a nip defined by the forming elements; and (b) passing the edible slab through the nip, thereby forming a sheet of confectionery pieces or individual pieces, wherein the edible slab has a first outer layer, a second outer layer, and at least one inner layer between the first and second outer layers.

The present invention also includes a process for making a confectionery product. The process comprises the steps of: (a) forming a solid or semi-solid edible slab having at least three layers, wherein the edible slab has a first outer layer, a second outer layer, and at least one inner layer between the first and second outer layers; (b) supplying the edible slab to at least two forming elements having a nip defined by the forming elements; (c) passing the edible slab through the nip, thereby forming a sheet of confectionery pieces or individual pieces; and optionally, (d) coating the formed confectionery pieces with an edible coating.

DETAILED DESCRIPTION OF THE INVENTION

Figure 1:
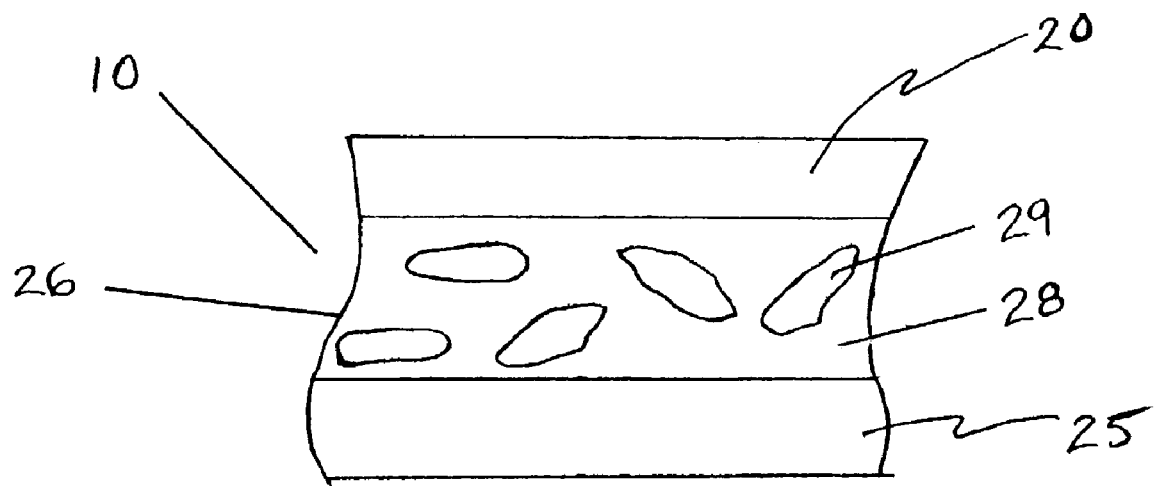
FIG. 1 is a cross sectional view of a preferred embodiment of a three layered edible slab that has a first and second outer layer of nougat and an inner layer of caramel with peanut inclusions.

Compression moulding by using forming elements is an effective means to shape a solid or semi-solid multilayered edible slab into a variety of shapes.

The present invention provides a method of using forming elements for such a purpose, where the confectionery material to be shaped is a solid or semi-solid edible slab having at least three layers. At least two forming elements having a nip defined by the forming elements are used to pass the edible slab through the nip. As the edible slab passes through the nip, a sheet of confectionery pieces or individual pieces is formed. The confectionery articles or pieces, may be for example, confectionery centers, finished confectionery pieces, shaped inclusions, toppings, and the like. Preferably, the confectionery pieces are confectionery centers.

The edible slab that is fed to the forming elements is a solid or semi-solid edible slab comprised of layers that are non-pourable or non-flowable confectionery material at the desired forming temperature, but are still capable of being moulded. The temperature of the edible slab is preferably about 5° C. to about 25° C. prior to entering the nip.

At least three layers make up the multilayered edible slab, namely, a first outer layer, a second outer layer, and an inner layer. If desired, additional inner layers may be included that are positioned between the first and second outer layers.

The layers may be comprised of various confectionery materials or mixtures thereof, such as for example, nougat, caramel, fondant, taffy, toffee, fudge, cream, truffle, guanduja, nuts of all varieties, cherries, raisins, cereal grains, crisp rice, chocolate, coconut, marshmallow, biscuits, cookies, and the like.

The first outer layer and the second outer layer may be the same or different. The inner layer may also be the same or different from the first and second outer layers. For example, the inner layer may be the same material as the first and second outer layers, but the inner layer may have a different density. Or there may be more than one inner layer. In a preferred embodiment, it has been found advantageous to design the edible slab such that the inner layer is comprised of tacky components such as caramel with peanuts, while having the first and second outer layers comprise components that are less tacky, such as nougat. When the confectionery piece is formed, the first and second outer layers will substantially encase the inner layer. By surrounding the tacky inner layer, the resultant confectionery piece will be easier to handle. Moreover, by designing the slab so that the first and second outer layers are the same, processing conditions at the forming rolls are simplified, since similar processing parameters can be used on each roll. If the first outer layer is different from the second outer layer, the processing conditions at the forming rolls are likely to be different. The forming roll that contacts the first outer layer would likely be set to one set of conditions, while the forming roll that contacts the second outer layer would be set to a second set of conditions, to handle the different components.

In addition, the edible slab may be comprised of more than one inner layers, which may be the same or different.

Preferred confectionery materials for the outer layers include, for example, nougat, marshmallow, taffy, toffee, chocolate, fudge, or fondant. Preferred confectionery materials for the inner layer(s) include, for example, caramel, cream, truffle, or guanduja.

It is also preferable that the inner layer contain any inclusions that may be used in the confectionery piece. Exemplary inclusions include, for example, cherries, raisins, cereal grains, coconut, biscuits, cookies, crisp rice or nuts of all varieties such as peanuts, hazelnuts, or almonds. Accordingly, it is preferable for the outer layers of the edible slab to be substantially free of inclusions.

One will recognize that the confectionery material selected for the outer layers must necessarily be able to release from the forming elements once the piece is formed.

The overall height of the edible slab is preferably set in accordance with the depth of the confectionery piece. Preferably the edible slab height is about 25% greater or less than the depth of the confectionery piece that will be formed. That is, the ratio of the edible slab height to depth of the confectionery piece is from about 0.75:1 to about 1.25:1. Preferably, the ratio of the edible slab height to depth of the confectionery piece is about 0.80:1 to about 1.2:1. More preferably, the ratio is about 0.85:1 to about 1.15:1, and most preferably, about 0.90:1 to about 1.10:1.

It should be understood that the height of each individual layer varies, but preferably follows the guidelines stated above. That is, the overall height of the layers combined, should preferably fall within the ratios defined above. Preferably, the overall height of the edible slab is between about 11 to about 15 mm, so that the depth of the formed confectionery pieces will be between about 11 to about 15 mm.

The edible slab is processed and shaped by a set of at least two forming elements. At least one of the forming elements has a surface that has cavities or recesses. In a preferred embodiment, both forming elements have cavities and the forming elements are arranged so that respective recesses in the forming elements are aligned opposite one another. As the forming elements rotate, the respective recesses contact and compress the edible slab, to form a confectionery piece. The shape of the confectionery piece is determined by the design of the recesses within each forming element. Preferably, the recess will have a lentil, egg, or spherical shape. The formed confectionery pieces will typically weigh about 0.8 g to about 4.0 g per piece.

Preferably, the forming elements are cooled to a temperature between about −30° C. and about 10° C. More preferably, between about −25° C. and about 0° C., and most preferably between about −15° C. and about −5° C. Cooling the forming elements may be accomplished by any suitable means. For example, brine water or glycol solution may be circulated through the central axis of each forming element. Typically, the forming elements may contain a plurality of cooling zones, which are located within the housing of the forming element. A cooling fluid is passed through these cooling zones by fluid input means, and discharged from the cooling chambers by fluid output means. Rotating means are also provided for rotating the forming elements.

In the process of the present invention, the forming elements are cooled to a temperature of from about −30° C. to about 10° C. Preferably, the forming elements are cooled to from about −15° C. to about −5° C.

A nip is defined by the minimum space or gap, which exists between the forming elements. It is beneficial to have the nip be from about 3.0 to about 0.3 mm, more preferably about 1.5 to about 0.5 mm. It should be understood that the nip spacing will vary according to the product design needs (e.g., cavity geometry), and ability to fracture the resulting webbing formed between pieces. As the edible slab is processed and compressed through the forming elements, the edible slab is moulded into the shape of confectionery pieces that may be interconnected by a web. The web is a result of the gap defining the nip. In most cases, the web is removed by tumbling the product in a rotating or vibrating perforated tube, such as a deflashing drum or a vibrating perforated surface or screen.

Optionally, an edible coating layer may be applied over the confectionery pieces formed by the process described above. The coating layer may be applied using various techniques, such as panning, enrobing, dusting, and the like. The edible coating layer can be applied over the confectionery pieces to serve a variety of purposes, such as for example, to ensure that a smooth surface is formed, to increase the size of the confectionery pieces, to protect (e.g., mechanical protection or oxidative protection) a fragile or sensitive center material, or to add an additional flavor or texture to the finished piece. Exemplary edible coatings include, but are not limited to, chocolate, sugar shells (crystalline or amorphous), compound coatings, yogurt (natural or artificial), confectionery polishes, and glazes. Of course, more than one edible coating layer may be applied if desired, such as a chocolate coating followed by a confectionery polish, which may be followed by a glaze.

FIG. 1 depicts edible slab 10, which is suitable for use with the present invention. The edible slab has first outer layer 20, second outer layer 25, and inner layer 26. In a preferred embodiment, the first outer layer and second outer layer are comprised of nougat and the inner layer is comprised of caramel 28 and peanuts 29.

Figure 2:
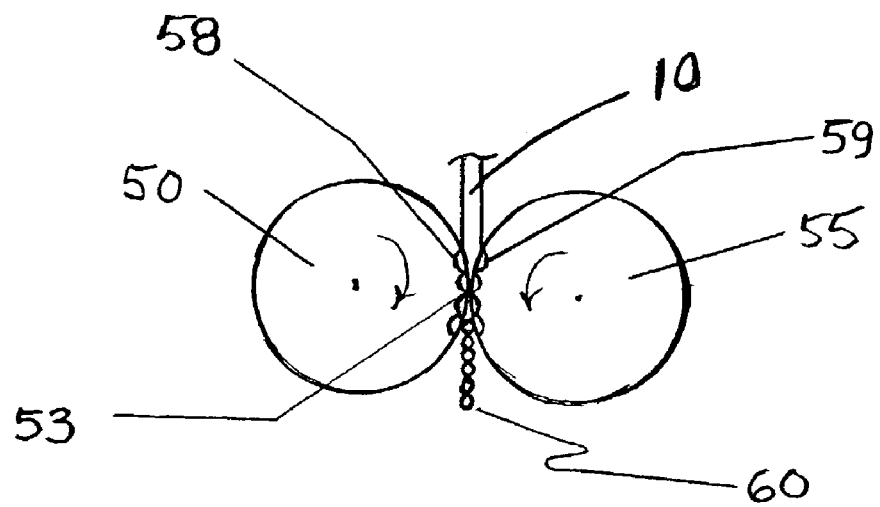
FIG. 2 is a schematic showing a three layered edible slab being fed into a pair of forming elements and the resulting sheet of center pieces that are formed.

In FIG. 2, edible slab 10 is shown entering pip forming rolls 50 and 55, which rotate inwardly towards one another. Recesses 58, which are on the surface of forming roll 50 are designed to be in alignment with recesses 59, which are on the surface of forming roll 55. Additionally, the minimum gap that separates forming roll 50 from forming roll 55 defines nip 53.

The present invention also contemplates a process for making a confectionery product. The process comprises the steps of: (a) forming a solid or semi-solid edible slab having at least three layers, wherein the edible slab has a first outer layer, a second outer layer, and at least one inner layer between the first and second outer layers; (b) feeding the edible slab to at least two forming elements having a nip defined by the forming elements; (c) compressing the edible slab through the nip, thereby forming a sheet of confectionery pieces or individual pieces. Optionally, an edible coating is applied to coat the confectionery pieces.

The solid or semi-solid edible slab may be formed by any suitable means that is capable of forming a three layered edible slab. For example, a sheeting extruder may be used to deposit layers upon one another. Or individual layers can be formed using forming rolls, and later bonded together one on top of the other.

EXAMPLE 1

A bite-sized three flavored fondant product is produced in the following manner. A single base fondant consisting of sugar, corn syrup, and a fat component is prepared. This single base fondant is split into three streams or batches with each stream being flavored and colored. One stream is a brown chocolate, the second stream is a red strawberry and the third stream is a white vanilla. The first fondant (brown chocolate flavored fondant) is formed into a 5 mm thick sheet by parallel chilled rolls and deposited onto a cooling band. After cooling, the second fondant (vanilla fondant) is similarly formed into a 5 mm slab and deposited on top of the previously formed single slab, resulting in a dual layered slab. The third fondant (strawberry fondant) is also formed into a 5 mm slab and deposited on top of the second fondant slab, resulting in the formation of a trilayered slab of three different flavors of fondant with a total height of 15 mm. The slab is then cooled to a temperature of 25° C. and fed to a pair of chilled forming rolls with egg shaped cavities and a height of 15 mm. The discharge from the rolls consists of a sheet of egg shaped pieces at a bulk temperature of about 15° C. connected by a web of material whose thickness is controlled by the gap spacing between the forming rolls. The resulting sheet is further cooled to 5° C. to enhance the fragility of the webbing between the pieces. This cooled web is then deflashed by conventional means, using a rotating drum with perforated walls. The resulting pieces appear to have chocolate fondant on one side and strawberry fondant on the other. The vanilla fondant is "hidden" inside the egg shaped piece and not visible upon initial inspection. When a consumer bites through the product, he or she discovers the third layer (vanilla fondant) hidden inside the egg.

Additionally, some of the egg shaped pieces are coated with chocolate and confectioners polish and/or glaze.

EXAMPLE 2

A bite sized three-layered product is produced in the following manner. A first nougat material containing a cooked sugar syrup that has been aerated in the presence of a stabilizing protein, such as egg or soy protein, and then blended with a flavoring material, such as cocoa powder dispersed in a vegetable fat is formed into a 5 mm thick slab using a parallel pair of chilled rolls. The slab is then placed on a cooling band. A single caramel layer containing a mixture of cooked syrup and milk components is prepared, formed into a 3 mm thick slab with a second pair of parallel chilled rolls and then deposited on top of the first nougat slab. The caramel layer is such that it may not be possible to handle individually formed pieces of caramel in a chocolate coating operation due to softness or adhesiveness. A second nougat material is then prepared in a similar fashion to the first nougat material, but is flavored using vanillin and formed into a 5 mm thick slab with a third pair of chilled rolls and deposited on top of the caramel slab. The resulting 13 mm slab has a 5 mm slab of cocoa flavored nougat in contact with the belt, a 3 mm slab of caramel resting between the cocoa and vanilla flavored nougats and the a 5 mm slab of vanilla nougat exposed to the air as the top of the slab. The slab is then cooled to a temperature of 10° C. in a cooling tunnel and then fed into a pair of chilled forming rolls having spherical cavities with a diameter of 14 mm. Compression and flow of the slab away from the flat spots between the cavities allows the 13 mm slab to deform into the 14 mm diameter cavities. The discharge from the rolls consists of a web of 14 mm spheres at a bulk temperature of about 7° C. connected by a thin web of material. Additional cooling lowers the temperature of the webbing further to −8° C., making the webbing brittle. The web is then broken and the flashing removed by a rotating drum with perforated walls. The resulting pieces show one side to be cocoa nougat, the other side to be vanilla nougat and potentially a thin (<1 mm) seam of caramel separating the two. This configuration confers a significant processing benefit, as it will be recalled the formulation of the caramel is such that it could not be chocolate coated by itself. Now that it is encased in nougat, the piece may be chocolate coated.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for making confectionery pieces, comprising the steps of:
   (a) providing a solid or semi-solid edible slab having at least three layers to at least two forming elements having a nip defined by said forming elements, wherein said edible slab has a first outer layer, a second outer layer, and at least one inner layer between said first and second outer layers; and
   (b) passing said edible slab through said nip, thereby forming a sheet of confectionery pieces or individual pieces, wherein said confectionery pieces or individual pieces have a first outer layer corresponding to said first outer layer of said edible slab, a second outer layer corresponding to said second outer layer of said edible slab, and at least one inner layer between said first and second outer layers corresponding to said at least one inner layer of said edible slab.

2. The process of claim 1, wherein said nip defined by said forming elements is about 3.0 to about 0.3 mm.

3. The process of claim 1, wherein the ratio of the edible slab height to depth of the confectionery piece is from about 0.85:1 to about 1.15:1.

4. The process of claim 1, wherein the overall height of said edible slab is between about 11 to about 15 mm.

5. The process of claim 1, wherein said formed confectionery pieces have a depth between about 11 to about 15 mm.

6. The process of claim 1, wherein said first and second layers are comprised of nougat and said inner layer is comprised of caramel and peanuts.

7. The process of claim 6, wherein said nougat substantially surrounds said caramel and peanuts.

8. The process of claim 1, wherein said formed confectionery pieces are substantially round.

9. The process of claim 1, wherein said formed confectionery pieces are lentil, egg, or substantially round shaped.

10. The process of claim 1, wherein said formed confectionery pieces have an individual piece weight of about 0.8 g to about 4.0 g.

11. The process of claim 1, wherein said edible slab has a second inner layer.

12. The process of claim 1, wherein said edible slab has a temperature of about 5° C. to about 25° C. prior to entering said nip.

13. A process for making a confectionery product, comprising the steps of:
 (a) forming a solid or semi-solid edible slab having at least three layers, wherein said edible slab has a first outer layer, a second outer layer, and at least one inner layer between said first and second outer layers;
 (b) supplying said edible slab to at least two forming elements having a nip defined by said forming elements;
 (c) passing said edible slab through said nip, thereby forming a sheet of confectionery pieces or individual pieces, wherein said confectionery pieces or individual pieces have a first outer layer corresponding to said first outer layer of said edible slab, a second outer layer corresponding to said second outer layer of said edible slab, and at least one inner layer between said first and second outer layers corresponding to said at least one inner layer of said edible slab; and optionally
 (d) coating said formed confectionery pieces.

14. The process of claim 13, wherein said first and second layers are comprised of nougat and said inner layer is comprised of caramel and peanuts.

15. The process of claim 13, wherein said coating is a chocolate coating.

16. The process of claim 13, wherein said formed confectionery pieces are substantially round.

17. The process of claim 13, wherein said formed confectionery pieces are lentil, egg, or substantially round shaped.

* * * * *